US012688960B2

(12) United States Patent
Sengodan et al.

(10) Patent No.: US 12,688,960 B2
(45) Date of Patent: Jul. 21, 2026

(54) REGENERATIVE SOLENOID DRIVE ARRANGEMENT

(71) Applicant: Hamilton Sundstrand Corporation, Charlotte, NC (US)

(72) Inventors: Rajkumar Sengodan, Namakkal (IN); Thilak Raj Durairaj, Shirley (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 222 days.

(21) Appl. No.: 18/621,235

(22) Filed: Mar. 29, 2024

(65) Prior Publication Data

US 2024/0428973 A1 Dec. 26, 2024

(30) Foreign Application Priority Data

Jun. 23, 2023 (IN) ............................. 202311042260

(51) Int. Cl.
*H01F 7/06* (2006.01)
*H01F 7/20* (2006.01)

(52) U.S. Cl.
CPC ............... *H01F 7/064* (2013.01); *H01F 7/20* (2013.01)

(58) Field of Classification Search
CPC .................................... H01F 7/064; H01F 7/20
See application file for complete search history.

(56) References Cited

U.S. PATENT DOCUMENTS 4,173,031 A 10/1979 Leichle
4,642,725 A * 2/1987 Vincent ................. H01F 7/1838 361/154
5,674,014 A 10/1997 Jordan
6,175,484 B1 1/2001 Caruthers et al.
6,392,370 B1 * 5/2002 Bedini ................... H02K 29/08 318/140
6,646,851 B1 * 11/2003 Gudat ..................... H02P 25/08 361/115
6,667,583 B2 12/2003 Kerenyi
7,382,065 B2 6/2008 Faggioli et al.
7,911,758 B2 * 3/2011 Haller ................... H02M 3/155 361/93.7

(Continued)

FOREIGN PATENT DOCUMENTS

| | | | |
|---|---|---|---|
| WO | 2011000731 | A1 | 1/2011 |
| WO | 2012061056 | A1 | 5/2012 |

OTHER PUBLICATIONS

European Search Report for Application No. 24183524.8, mailed Oct. 31, 2024, 9 pages.

*Primary Examiner* — Scott Bauer
(74) *Attorney, Agent, or Firm* — CANTOR COLBURN LLP

(57) ABSTRACT

A solenoid drive circuit includes a power source, a first solenoid control circuit connected to the power source, the first solenoid control circuit including a first solenoid coil and a first solenoid control switch that controls a flow current through the first solenoid coil and a first regenerative drive circuit connected to the first solenoid control circuit and that includes a first regenerative capacitor. The first regenerative drive circuit can include a first diode bridge formed of four diodes (D1, D2, D3 and D4) and that has a positive input, a negative input, a positive output and a negative output, wherein the first regenerative capacitor is connected between the positive and negative inputs.

16 Claims, 10 Drawing Sheets

(56) References Cited

U.S. PATENT DOCUMENTS

| | | | |
|---|---|---|---|
| 8,649,150 | B2 | 2/2014 | Buxton |
| 10,210,979 | B2 | 2/2019 | Olausson et al. |
| 2007/0188967 | A1 | 8/2007 | Smith et al. |

* cited by examiner

REGENERATIVE SOLENOID DRIVE ARRANGEMENT

CROSS-REFERENCE TO RELATED APPLICATIONS

This application claims the benefit of Indian patent application No. 202311042260 filed Jun. 23, 2023, the disclosure of which is incorporated herein by reference in its entirety.

BACKGROUND

The present disclosure relates generally to circuit drivers, and more specifically to a solenoid driver circuit with regeneration capabilities.

Electromechanical solenoids are used in valves, relays, and contactors. These solenoids consist of an electromagnetically inductive coil wound around a moveable steel or iron slug called the armature or plunger. Solenoid drive circuits used to power the electromechanical solenoid coils are typically either “voltage-controlled” or “current-controlled”.

A voltage-controlled solenoid drive circuit applies a regulated, rated voltage to energize an electromechanical solenoid. Applying the full rated voltage continuously results in a higher power dissipation within the drive circuit and the solenoid. Hence, a variation of the voltage-controlled drive circuit applies the full regulated voltage to “pull-in” the solenoid and then a reduced voltage to “Hold” the solenoid in its engaged position.

BRIEF SUMMARY

According to an embodiment, a solenoid drive circuit is disclosed. The circuit includes: a power source; a first solenoid control circuit connected to the power source, the first solenoid control circuit including a first solenoid coil and a first solenoid control switch configured to control a flow current through the first solenoid coil; and a first regenerative drive circuit connected to the first solenoid control circuit and that includes a first regenerative capacitor. The first regenerative drive circuit includes: a first diode bridge formed of four diodes (D1, D2, D3 and D4) and that has a positive input, a negative input, a positive output and a negative output, wherein the first regenerative capacitor is connected between the positive and negative inputs.

In addition to one or more of the features described herein, or as an alternative to any of the foregoing embodiments, the first regenerative drive circuit can include a storage input connected to the first solenoid control circuit so that current from the first solenoid control circuit can be provided to and stored in the first regenerative capacitor.

In addition to one or more of the features described herein, the first regenerative drive circuit can include a switch that selectively allows current to pass from the first solenoid control circuit to the first regenerative capacitor.

In addition to one or more of the features described herein, the first regenerative drive circuit can include two switches arranged such that only one of them is open at a time, wherein a first of the two switches is connected between the storage input and the first regenerative capacitor and a second of the two switches is connected between positive input and the first regenerative capacitor.

In addition to one or more of the features described herein, the solenoid drive circuit can also include a control circuit that controls the state of the first solenoid control switch, and the two switches to operate at least in a charge mode, a pull-in mode and a hold mode.

In addition to one or more of the features described herein, in the charge mode the first solenoid control switch is closed, and the first of the two switches is open so that current that is provided to the first solenoid control circuit by the power source is stored in the first regenerative capacitor.

In addition to one or more of the features described herein, in the pull-in mode the first solenoid control switch is opened, and the second of the two switches is open so that charge stored in the first regenerative capacitor and current that is provided by the power source can both be provided to the first solenoid coil.

In addition to one or more of the features described herein, in the hold mode, the first solenoid control switch is selectively opened and closed to control a current through first solenoid coil the second of the two switches is open so energy provided by the power source that is not allowed to pass through the first solenoid coil when the first solenoid control switch can be provided to the first regenerative capacitor.

In addition to one or more of the features described herein, the solenoid drive circuit can include a second solenoid control switch connected between the first solenoid control switch and ground. A node can be defined between first and second solenoid control switches that is connected to a negative terminal of power source.

In addition to one or more of the features described herein, in the charge mode the first solenoid control switch is closed, and the first of the two switches is open so that the current that is provided to the first solenoid control circuit by the power source is stored in the first regenerative capacitor.

In addition to one or more of the features described herein, in the pull-in mode the first and the second solenoid control switches are opened, and the second of the two switches is open so that charge stored in the first regenerative capacitor and current that is provided by the power source can both be provided to the first solenoid coil.

In addition to one or more of the features described herein, in the hold mode, the first solenoid control switch is selectively opened and closed to control a current through the first solenoid coil. The second of the two switches is open so energy provided by the power source that is not allowed to pass through the first solenoid coil when the first solenoid control switch can be provided to the first regenerative capacitor.

Also disclosed are methods of controlling a solenoid drive circuit. The methods can be applied to any solenoid drive circuit described above or otherwise disclosed herein. In one embodiment, the circuit includes a switch that selectively allows current to pass from the first solenoid control circuit to the first regenerative capacitor.

The methods can include operating the circuit in at least one of a charge mode, a pull-in mode and a hold mode.

In addition to one or more of the features described herein, when operating in the charge mode the first solenoid control switch is closed, and the first of the two switches is open so that current provided to the first solenoid control circuit by the power source is stored in the first regenerative capacitor.

In addition to one or more of the features described herein, when operating in pull-in mode the first solenoid control switch is opened, and the second of the two switches is open so that charge stored in the first regenerative capacitor and current that is provided by the power source can both be provided to the first solenoid coil.

In addition to one or more of the features described herein, in the hold mode, the first solenoid control switch is selectively opened and closed to control a current through the first solenoid coil and the second of the two switches is open so energy provided by the power source that is not allowed to pass through the first solenoid coil when the first solenoid control switch is closed can be provided to the first regenerative capacitor.

In addition to one or more of the features described herein, when the circuit includes the second solenoid control switch connected between the first solenoid control switch and ground the modes can be as follows: in the charge mode the first solenoid control switch is closed, and the first of the two switches is open so that current provided to the first solenoid control circuit by the power source is stored in the first regenerative capacitor; in the pull-in mode the first and the second solenoid control switches are opened, and the second of the two switches is open so that charge stored in the first regenerative capacitor and current that is provided by the power source can both be provided to the first solenoid coil; and in the hold mode, the first solenoid control switch is selectively opened and closed to control a current through first solenoid coil the second of the two switches is open so energy provided by the power source that is not allowed to pass through the first solenoid coil when the first solenoid control switch can be provided to the first regenerative capacitor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
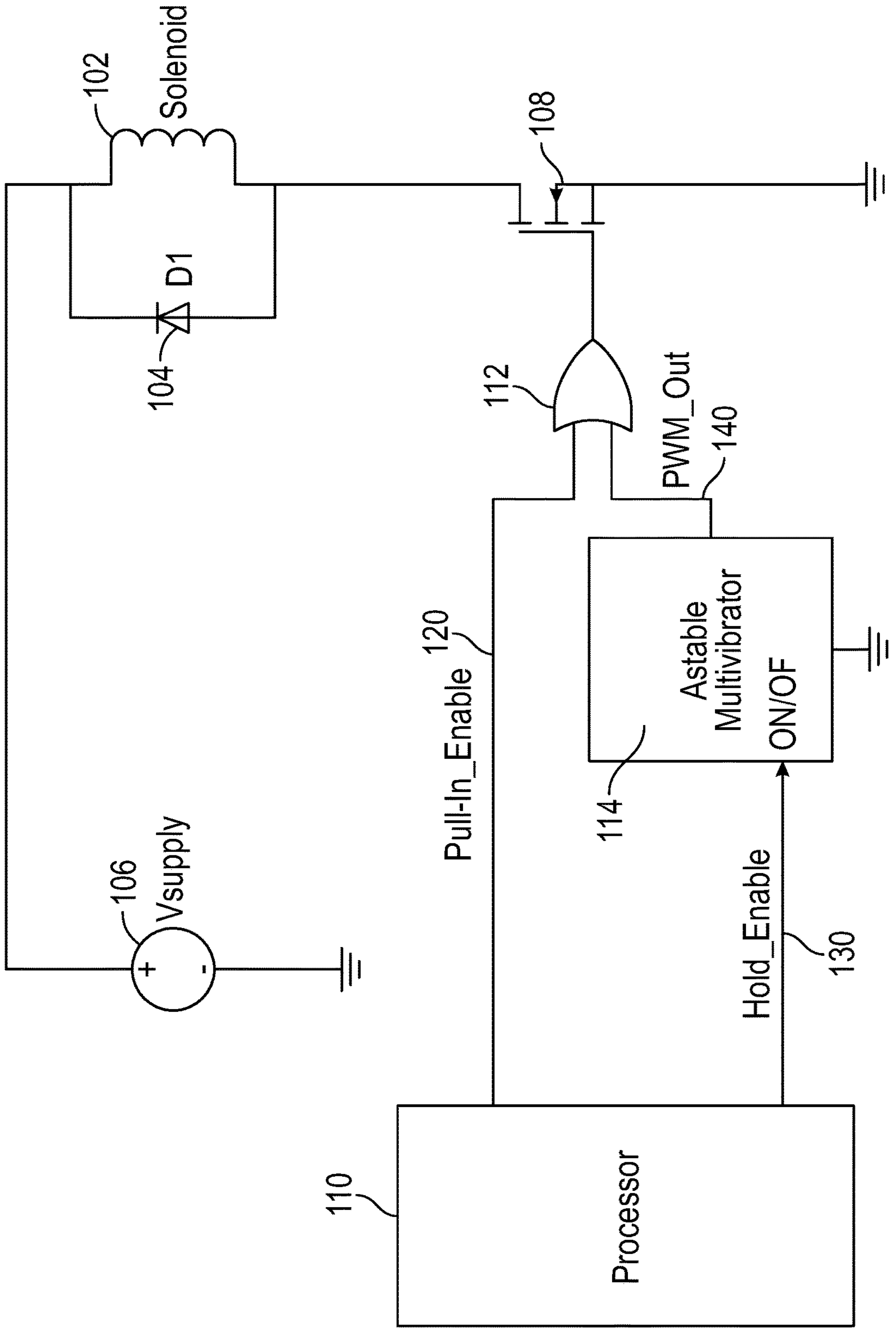
FIG. 1 (Prior Art)
FIG. 1 depicts a prior art voltage-based solenoid driver circuit.

By way of further background, and with reference to FIG. 1, Typically in safety-critical aerospace applications if there is an intermittent power interruption whilst a line replaceable unit (LRU) is in a particular state, it needs to return to the same state once power is restored. The LRUs that employ solenoid drives are often at the lowest level in a control system and rely on commands from the upper-level sub-system to operate the solenoids. The solenoid coils need more current during actuation, called the "pull-in" current, to pull the plunger into the solenoid when compared to the current used to hold the plunger in position. However, once the solenoid is actuated the coil only needs approximately 20-30% of its nominal current, called the "hold" current, to keep the plunger in its engaged position. Solenoid drive circuits operate the solenoid with "pull-in" current initially and then switch to the "hold" mode to conserve power.

Some circuits operate in a continuous pull-in mode leading to excessive waste of power. The automatic change over from "hold" mode to the "pull-in" mode can be implemented in software by monitoring the solenoid power supply but it is an added overhead to the software especially when the processor runs a control loop involving multiple solenoids. The techniques described herein provide a hardware solution for switching from the "pull-in" mode to the "hold" mode for operating the solenoid and vice versa.

FIG. 1 depicts a prior art configuration of a circuit 100 for a voltage-based solenoid driver. The circuit 100 includes a solenoid 102 that is coupled to a diode 104. The solenoid 102 is configured to receive a supply voltage from a voltage supply source 106. The solenoid 102 is coupled to the switch 108 which is under the control of the processor 110. The processor 110 is configured to send commands (Hold_Enable signal 130) to a multivibrator circuit 114 which operates to send a signal (PWM_OUT signal 140) to the switch 108 according to a pre-determined interval. The output signal (Pull-in_Enable signal 120) from the processor 110 and the output of the multivibrator circuit 114 is coupled to the logic OR gate 112 to control the switch 108. When energized, a voltage-controlled solenoid drive circuit operates in the "pull-in" mode for a fixed period of time (pull-in interval), then changes to a "hold" mode after the pull-in interval. The interval is set by hardware or by a processor/controller software. During the hold mode the PWM signal is provided.

Disclosed herein are systems/methods that results in a solenoid drive system that is more efficient than the existing art. The systems/methods can be configured in electrical drive application where power management and precision drive is significant. Embodiments herein can provide for higher voltage requirement during pull-in drive. In particular, embodiments can regulate the pull-in and hold current to the required value with lower input voltage (e.g., the voltage supply can be rated to supply a lower current/voltage than would typically be needed for pull-In in prior art systems. This can be accomplished by providing a regenerative circuit connected to drive circuit.

In one embodiment, this circuit can include storage elements (e.g., capacitors) that can be changed to a level approximately equal to the input voltage. Then, during pull-in both storage elements and the voltage supply can be arranged such they both provide voltage/current to the solenoid and, thus, the amount of current provided during pull-in can be about double the voltage provided if only the voltage supply was provided. The circuit can be applied to single or double control switch solenoid drivers as shown below. In the case of double control switch configuration, multiple solenoids can be pulled in/held and can reduce overvoltage and reduce the overvoltage stress on switches which will help to use off-the-shelf parts.

Further, when the solenoid is "released" the energy stored therein can be stored in the storage element. This allows for at least some of the energy used during pull-in/hold to be recaptured and provided to other locations in the system (e.g., to other parts of an aircraft or to another storage element such as a battery).

While not being bound by theory, it should be appreciated herein that pull-in voltage and the hold voltage each have an associated operating current. This current flows through the solenoid coil and induces the magnetic field required to energize the solenoid and change its state. This current is equal to voltage across the solenoid coil, divided by the resistance of the coil. Coil-current (I)=coil-voltage (V)/coil-resistance. The present disclosure can be utilized for solenoid drive having adjustable voltage and current control. It shall further be appreciated based on the disclosure herein that one or more charge pump regenerative configurations are provided for generating pull-in and for capturing energy discharged from the solenoid when it is released.

FIGS. 2A-2D show an example of a solenoid control circuit 200 that is driven by a power source V1. The circuit 200 includes a solenoid drive circuit 202 connected to a regenerative drive circuit 204. The solenoid drive circuit 202 and the regenerative drive circuit 204 can be connected to control circuit 206 that operates them both. The control circuit 206 can be configured to open and close various switches as discussed herein and can be used to control one or multiple solenoid drive circuit and the regenerative drive circuit combinations.

For simplicity, in FIGS. 2A-2D the control circuit 206 will be shown as receiving inputs from various sensors to control the current through one or more solenoid coils (e.g., L1) to operate a solenoid. As shown, the control circuit 206 includes a signal (Vsense1) that is indicative of the current passing through the solenoid coil L1 during pull-in and hold operations so that is generate an appropriate control input signal at the solenoid control switch (S1). This control input signal can be produced as described in FIG. 1 or directly by the control circuit 206 or by other circuit elements. During pull-in the control input signal can be constant and during hold the control input signal can be a pulse width modulated signal.

The control circuit 206 also receives a signal that is indicative of a charge stored in the regenerative drive circuit 204 and in particular, to a voltage stored in C1.

The regenerative drive circuit 204 can provide assistance during pull-in and store power discharged from the solenoid coil L1 when the plunger is released. As will be understood from FIG. 2, the regenerative drive circuit 204 is a diode bridge-based circuit that includes a diode bridge formed by D1-D4.

As shown, the solenoid drive circuit 202 includes a solenoid coil L1. The solenoid coil L1 can be arranged such that it can receive power from the power supply V1. As shown, the connection between the solenoid coil L1 and the power supply V1 is direct but other elements (e.g., resistors, etc) could be connected between them. Similar to the above, current flow though the solenoid coil L1 is controlled by solenoid control switch S1. The solenoid control switch S1 will receive a control input signal at its control input that is substantially constant during pull-in and that is a PWM signal during a hold. The control input signal can be generated by the control circuit 206. As shown, the solenoid control switch S1 couples solenoid coil L1 to ground when it is opened and causes energy stored in the solenoid coil L1 to pass through D10 when it is closed. As shown, S1 (and the other switches herein) is a metal-oxide field effect transistor (MOSFET). This is by way of example and other types of switches that could be used include field effect transistors (FETs), bipolar junction transistors (BJTs), a silicon-controlled rectifiers (SCRs), and insulated gate bipolar transistors (IGBTs) to name but a few. The switch S1 can be arranged such that upon an appropriate control input signal being provided, current can flow in the direction indicated by arrow A.

A sensor 210 can be provided between the solenoid coil L1 and the solenoid control switch S1 to monitor current through the solenoid coil L1.

The solenoid drive circuit 202 also includes a diode D13 connected between V1 and a storage input 240 of the regenerative drive circuit 204. In one embodiment, D13 is a Zener diode. A second diode D10 is connected between the solenoid coil L1 and the anode of diode D13.

In operation, when the control input signal allows for current to pass, the solenoid coil L1 is charged by a current arising from the power supply V1. When the control input signal blocks current from passing, the charge in the solenoid coil L1 is steered through diode D10. As noted above, control of the charge through the solenoid coil L1 by switch S1 can allow for pull-in, hold, and discharge of the charge in the solenoid coil L1.

The regenerative drive circuit 204 includes a diode bridge formed between D1-D4. The diode bridge includes "input" terminals at nodes 230, 232 and output terminals at nodes 242, 244.

One side of the bridge (node 244 between D2 and D4) is connected to ground and the other side is connected to the negative terminal of the power supply V1. That is, the positive output terminal at node 242 between D1 and D3 is connected to the negative terminal of the power supply V1 and the negative output terminal at node 244 (between diodes D4 and D2) is connected to ground.

A storage section 250 is connected between nodes 230, 232. The storage section 250 can be used to store energy in a charging phase that is released later to assist during pull-in. To that end, the storage section 250 includes a capacitor C1 connected to node 232. Current presented at the storage input 240 can be provided into the capacitor C1 based on the configuration of switches S4 and S7. As shown, S4 and S7 can receive a same input signal and are arranged such that only one of them passes current at a time. S4 is connected between node 230 and the capacitor C1 and S7 is connected between the storage input 240 and the capacitor C1. The control inputs of S4 and S7 are shown tied together by inverter A10 but other manners of having only one or the other S4/S7 "open" could be implemented.

During operation, in the first mode (and a shown in FIG. 2A) is a charging mode in which charge is provided into capacitor C1. During that phase, S1 and S4 are closed and S7 is open. As such, a current path is provided shown by the large arrows labelled "C" in FIG. 2A. That is, current flows as follows:

$$V1 \rightarrow D13 \rightarrow S7 \rightarrow C1 \rightarrow D3 \rightarrow V1.$$

Thus, at the end of the charge phase, the voltage at C1 is approximately at the same level as V1. This allows for the voltage V1/C1 combo to collectively apply twice the magnitude of the voltage of V1 across the inductor coil L1.

Figure 2A:
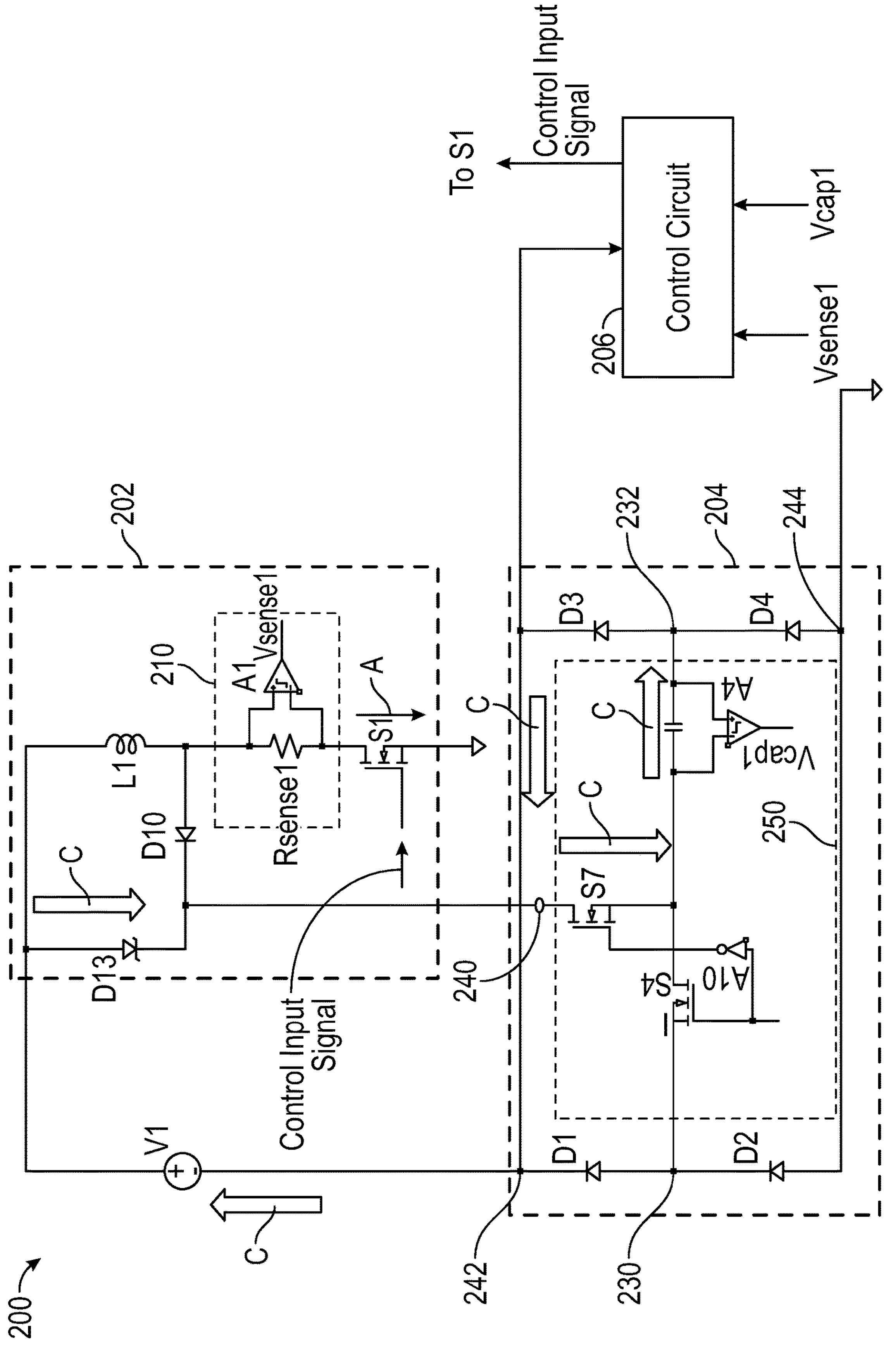
FIGS. 2A-2D show a single solenoid drive circuit that includes a single control switch and that is connected to a single regenerative drive circuit in various modes.
Figure 2B:
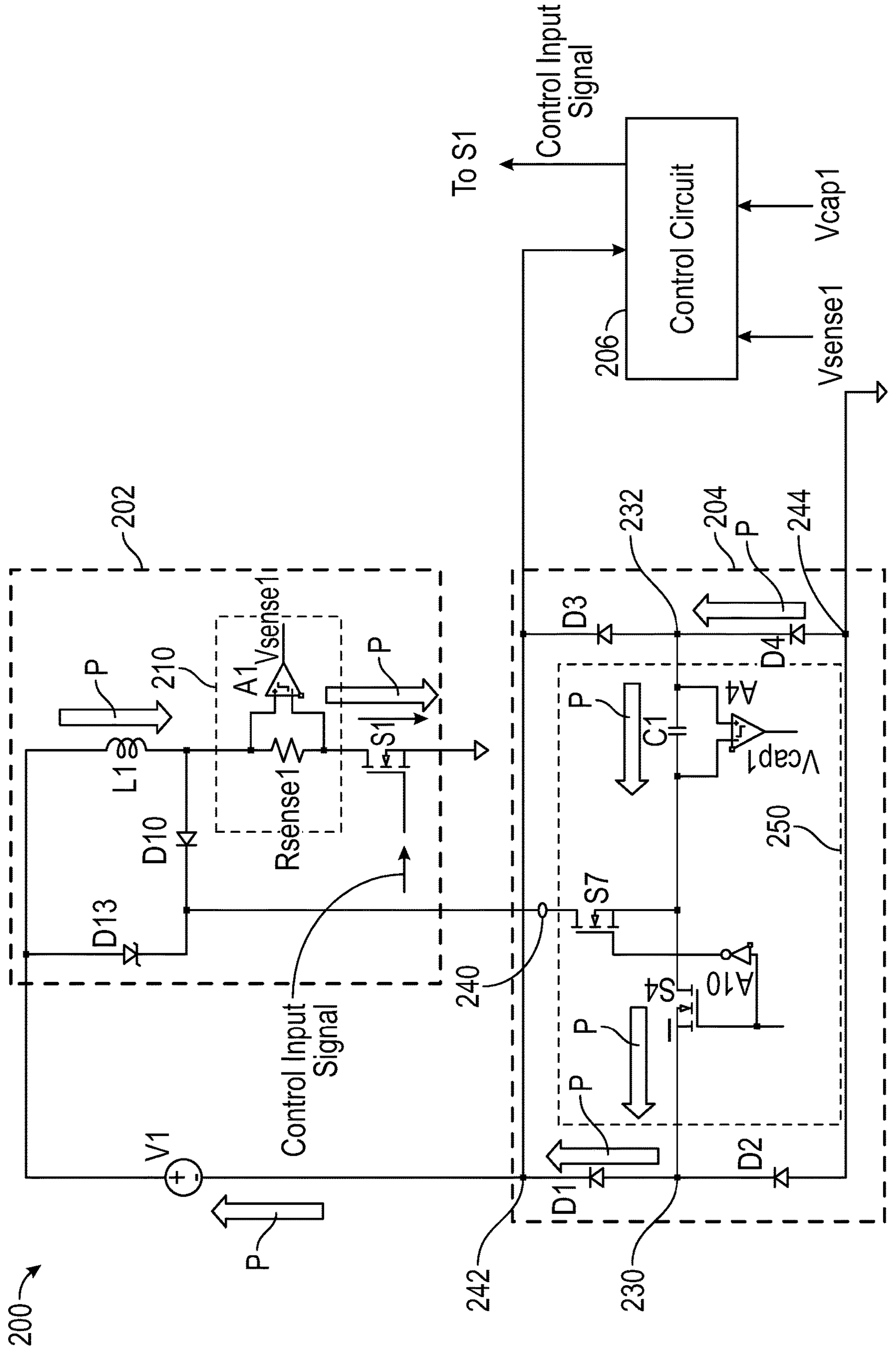
Figure 2C:
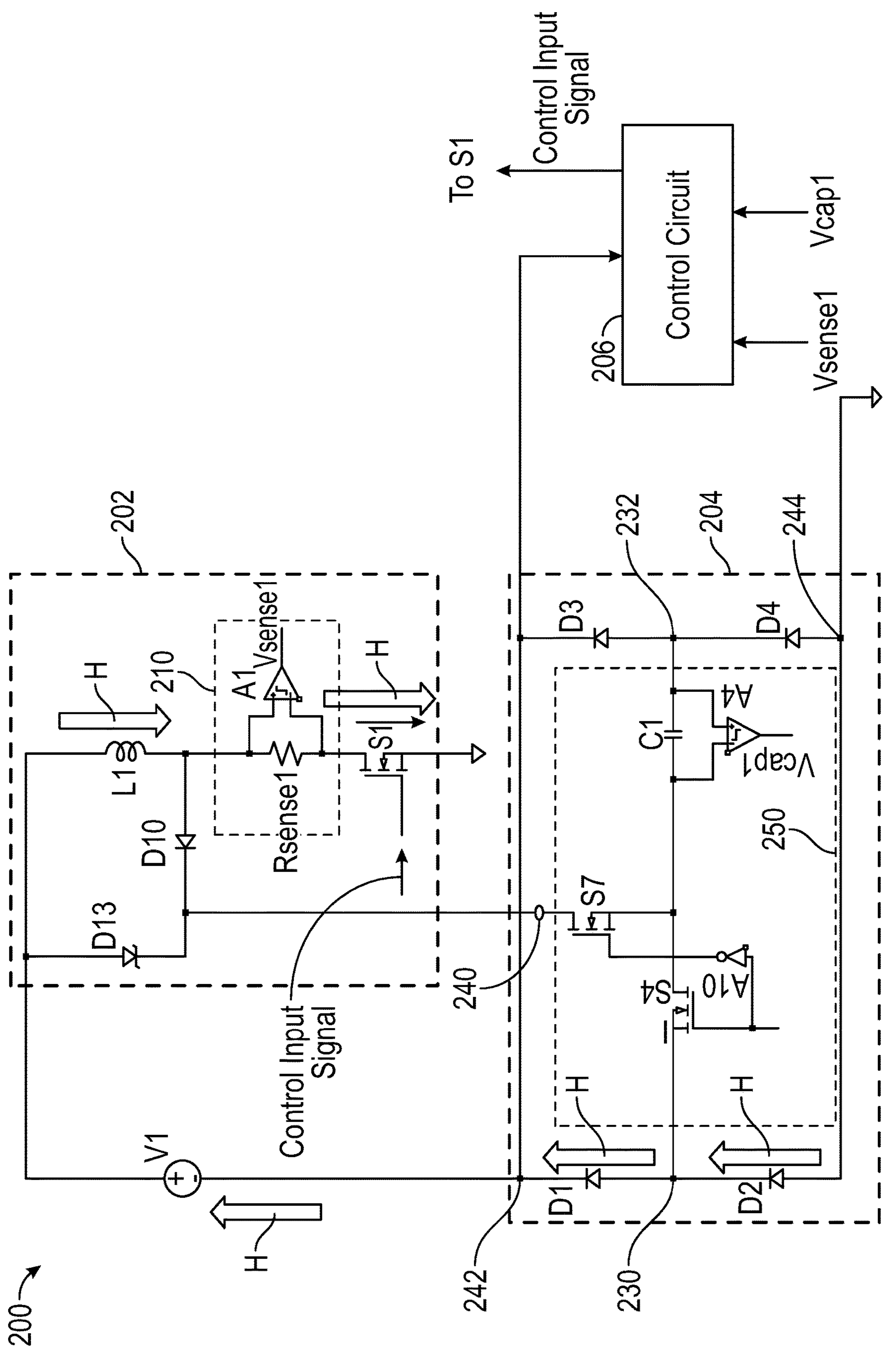

With reference to FIG. 2B, next, during pull-in, S1 and S4 are opened and S7 is closed. This results in the V1 and the charge stored in C1 being applied across L1/S1. The solenoid current path during pull-in operation is GND→D4→C1→S4→D1→V1→L1→Rsense1→S1→S10→GND as shown by the large arrows labelled "P" in FIG. 2B.

During hold, S4 is closed and V1 drives L1 as in the prior art. The current path is V1→L1→Rsense1→S1→V1 as indicated by the large arrows labelled "H" shown in FIG. 2C. During hold, the controller can initiate hold current operation either by providing PWM or reducing the voltage source V1. PWM implementation may allow for establish constant current in solenoid and has duty cycle 0%-100% based on voltage source V1. This operation can continue until the solenoid is released.

Figure 2D:
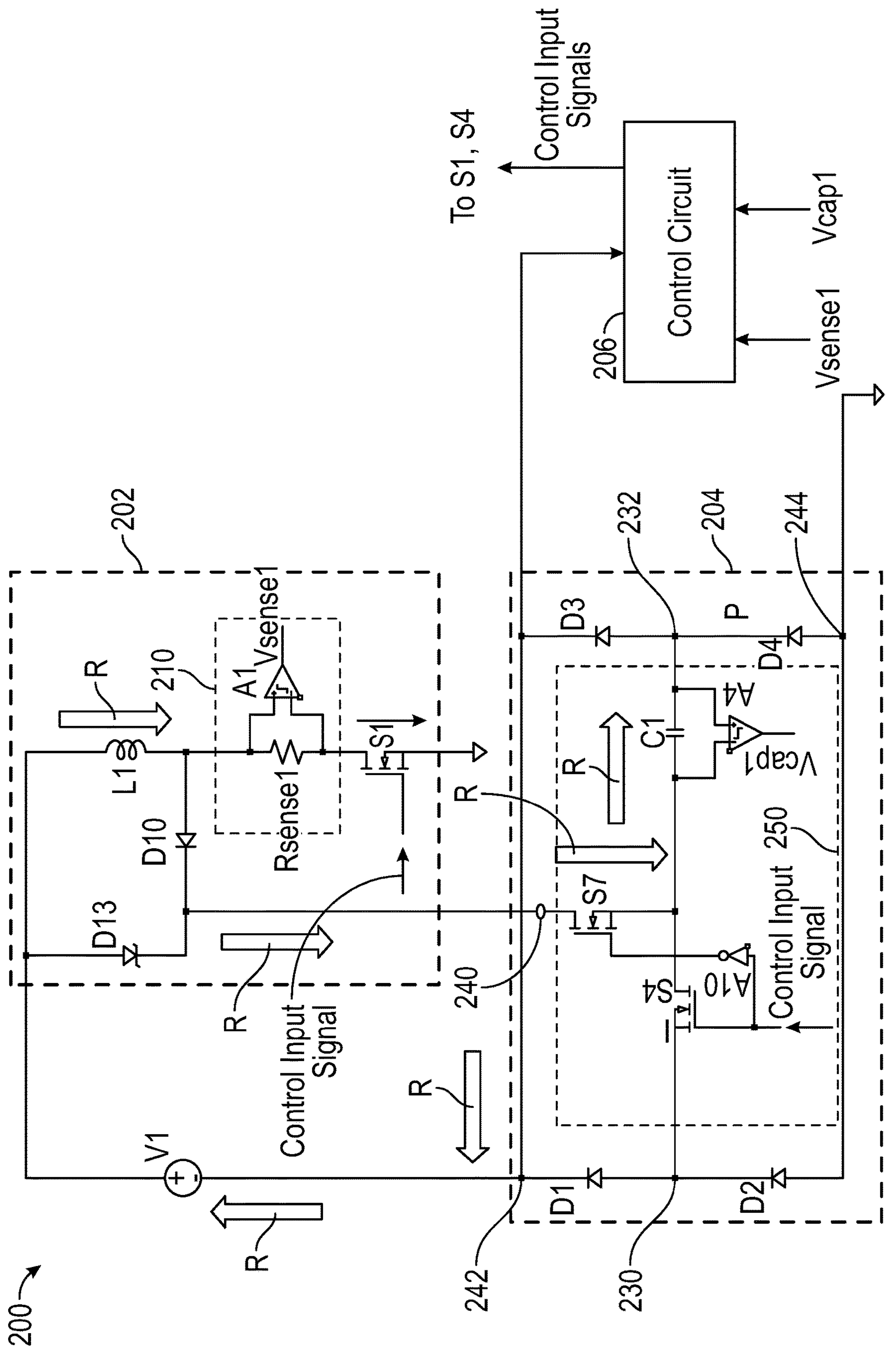

At that time, S1 can be closed and S7 is opened. This is shown in FIG. 2D. The magnetic field in the solenoid coil L1 inductance "collapses," "causing the inductor current to recirculate through the solenoid coil L1 to maintain the magnetic field of the solenoid. This in turn forces the current to flow through the second diode D10, which acts as a steering diode. This is a so-called regeneration phase and is current path is shown by arrows R. During this time, the net voltage stored in capacitor C1 is equal to demagnetization voltage —L1*di/dt+V1. More precisely, there will be some voltage drop across to the Diodes D13 and D10 but that can be factored in as needed.

In this and all other embodiments, size of the capacitor C1 (or C2/C3 below) is selected based on the value of L/R time constant and the desired circuit response speed. The size of the capacitor C1 can vary the charging and discharging circuit operation as will be understood by the skilled artisan.

In some instances, the charge stored in C1 can be provided to the control circuit 206 or another element such as a DC-to-DC converter by turning off V1 and opening S4.

In the above example, a single switch S1 was provided in the solenoid drive circuit 202 and only a single solenoid drive circuit 202 was shown. It shall be understood that multiple solenoid drive circuits 202 could be provided and all be driven by and connected to V1. Further, each of the solenoid drive circuit 202 could be connected to a regenerative drive circuit 204. Each regenerative drive circuit 204 can be the same and can share diodes as shown, for example in FIGS. 3A-3E.

FIGS. 3A-3E show how one of a multiple of solenoid drive circuits 302*a*, 302*b*, 302*c* (referred to as 302) can be operated. The operation is applicable to any number of solenoid drive circuits 302 and is not limited to the three shown in FIGS. 3A-3E. The solenoid drive circuits 302 operate in a similar manner as the solenoid drive circuit 202 of FIG. 2 but include two control switches S1/S10. In general, the first S1 is conducting during pull-in and pulsed or otherwise selectively controlled during hold. S10 is open during pull-in and otherwise off. For clarity, the terms on/off for switches herein mean that switch is passing current or blocking current, respectively. In this case, the "control signal" from FIG. 2 is implements as two signals, hold active and pull-in active both of which can be controlled by the control circuit 206. It shall be understood that during hold, S1 can be pulsed in the PWM manner or in other manners to control current in the coils L1-L3.

Further, the teachings related to the regenerative drive circuits 304*a*, 304*b*, 304*c* below can be applied in context of the solenoid drive circuit 202 discussed above.

Figure 3A:
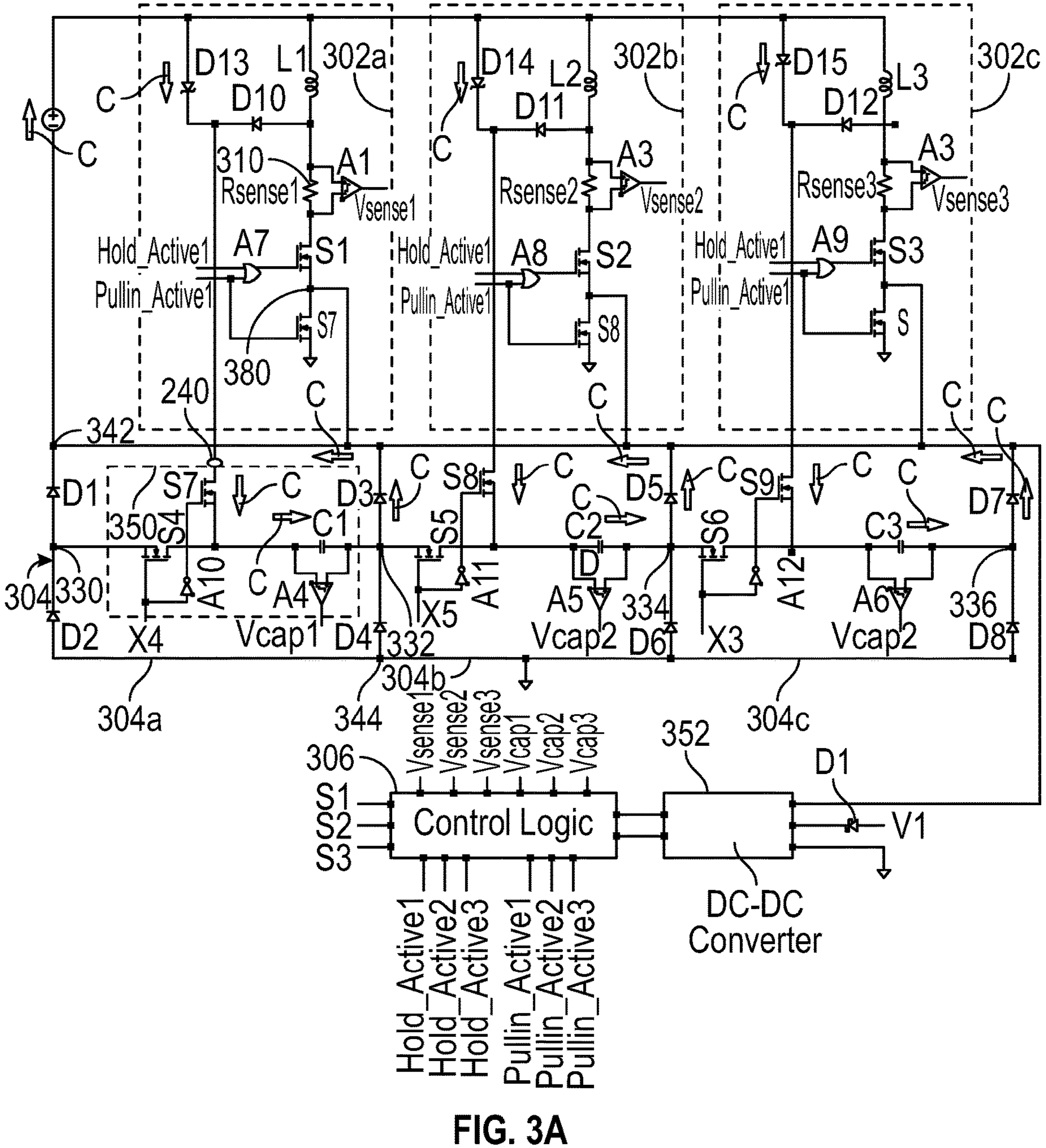
FIGS. 3A-3E show three solenoid drive circuits that each includes two control switches that are each individually connected to multi-portion regeneration regenerative drive circuit in various modes.

In more detail, and with reference to FIG. 3A, each solenoid drive circuit 302*a*-302*c* includes a solenoid coil L1, L2, L3. For simplicity, only the first solenoid drive circuit 302*a* will be described in detail but the configuration of each is the same. The solenoid coil L1 can be arranged such that it can receive power from the power supply V1. As shown, the connection between the solenoid coil L1 and the power supply V1 is direct but other elements (e.g., resistors, capacitors, etc.) could be connected between them. Similar to the above, current flow though the solenoid coil L1 is controlled by the first solenoid control switch S1. A second solenoid control switch S10 is connected between the S1 and ground. A node 380 is provided between S1 and S10. Depending on the status of S10, the output of S1 (e.g., node 380) can be connected to either ground or to the regenerative drive circuit 304.

The first solenoid control switch S1 will receive a control input signal at its control input that is substantially constant during pull-in and that is a PWM signal during a hold. The control input signal can be generated by the control circuit 306 currently 306 is regenerative drive circuit. As shown, the solenoid control switch S1 couples solenoid coil L1 to ground when it is opened and causes energy stored in the solenoid coil L1 to pass through D10 when it is closed. As above, S1/S10 (and the other switches herein) are MOSFETs. This is by way of example and other types of switches could be used. The solenoid drive circuits 302 further includes an OR gate A7 that receive the hold and pull-in active signals. The pull-in signal is also provided to a control terminal (e.g., gate) of the second solenoid control switch S10. The output of the OR gate A7 is connected through an inverting gate A13 to a control terminal (e.g., gate) of the first solenoid control switch S1 and is also connected to node 380.

A sensor 310 can be provided between the solenoid coil L1 and the first solenoid control switch S1 to monitor current through the solenoid coil L1. The sensor 310 can include a sense resistor Rsense1 and an amplifier A1.

The solenoid drive circuit 302*a* also includes a diode D13 connected between V1 and a storage input 340 of the regenerative drive circuit 204. In one embodiment, D13 is a Zener diode. A second diode D10 is connected between the solenoid coil L1 and the anode of diode D13.

The regenerative drive circuit 304 includes three portions. The first portion 304*a* includes a diode bridge formed between D1-D4. The diode bridge includes "input" terminals at nodes 330, 332 and output terminals at nodes 342, 344.

The second portion 304*b* includes a diode bridge formed between D3-D6. The diode bridge includes "input" terminals at nodes 330, and "output" terminals at nodes 342, 344. The second portion 304*b* shares diodes D3/D4 with the first portion 304*a*.

The third portion 304*c* includes a diode bridge formed between D5-D8. The diode bridge includes "input" terminals at nodes 334, 336 and output terminals at nodes 342, 344. This portion shares diodes D5/D6 with the second portion 304*b*.

In each of the portions (but only described relative to the first portion) one side of the bridge (node 344 between D2 and D4) is connected to ground and the other side is connected to the negative terminal of the power supply V1. That is, the positive output terminal at node 342 between D1 and D3 is connected to the negative terminal of the power supply V1 and the negative output terminal at node 344 (between diodes D4 and D2) is connected to ground.

A storage section 350 is connected between nodes 330, 332. The storage section 350 can be used to store energy in a charging phase that is released later to assist during pull-in. To that end, the storage section 350 includes a capacitor C1 connected to node 332. The other portions include capacitors C2 and C3 similarly arranged. Current presented at the storage input 340 can be provided into the capacitor C1 based on the configuration of switches S4 and S7. As shown, S4 and S7 can receive a same input signal and are arranged such that only one of them passes current at a time. S4 is connected between node 330 and the capacitor C1 and S7 is connected between the storage input 340 and the capacitor C1. The control inputs of S4 and S7 are shown tied together by inverter A10 but other manners of having only one or the other S4/S7 "open" could be implemented.

During operation, while charging (and a shown in FIG. 3A) is a charging mode in which charge is provided into capacitors C1, C2 and C3. During that phase, S1/S10 and S4 are closed and S7 is open. As such, a current path is provided shown by the large arrows labelled "C" in FIG. 3A. That is, current flows as follows:

$$V1 \rightarrow D13 \rightarrow S7 \rightarrow C1 \rightarrow D3 \rightarrow V1.$$

Thus, at the end of the charge phase, the voltage at C1 is approximately at the same level as V1. This allows for the voltage V1/C1 combo to collectively apply twice the magnitude of the voltage of V1 across the solenoid coil L1.

It should be noted that equivalent switches to those described relative to elements 302*a*/304*a* are in the same state resulting in C2/C3 being similarly charged. In particular, to charge C2, the path is V1→D14→S8→C2→D5→V1 and to charge C3 the path is V1→D15→S9→C3→D7→V1.

Figure 3B:
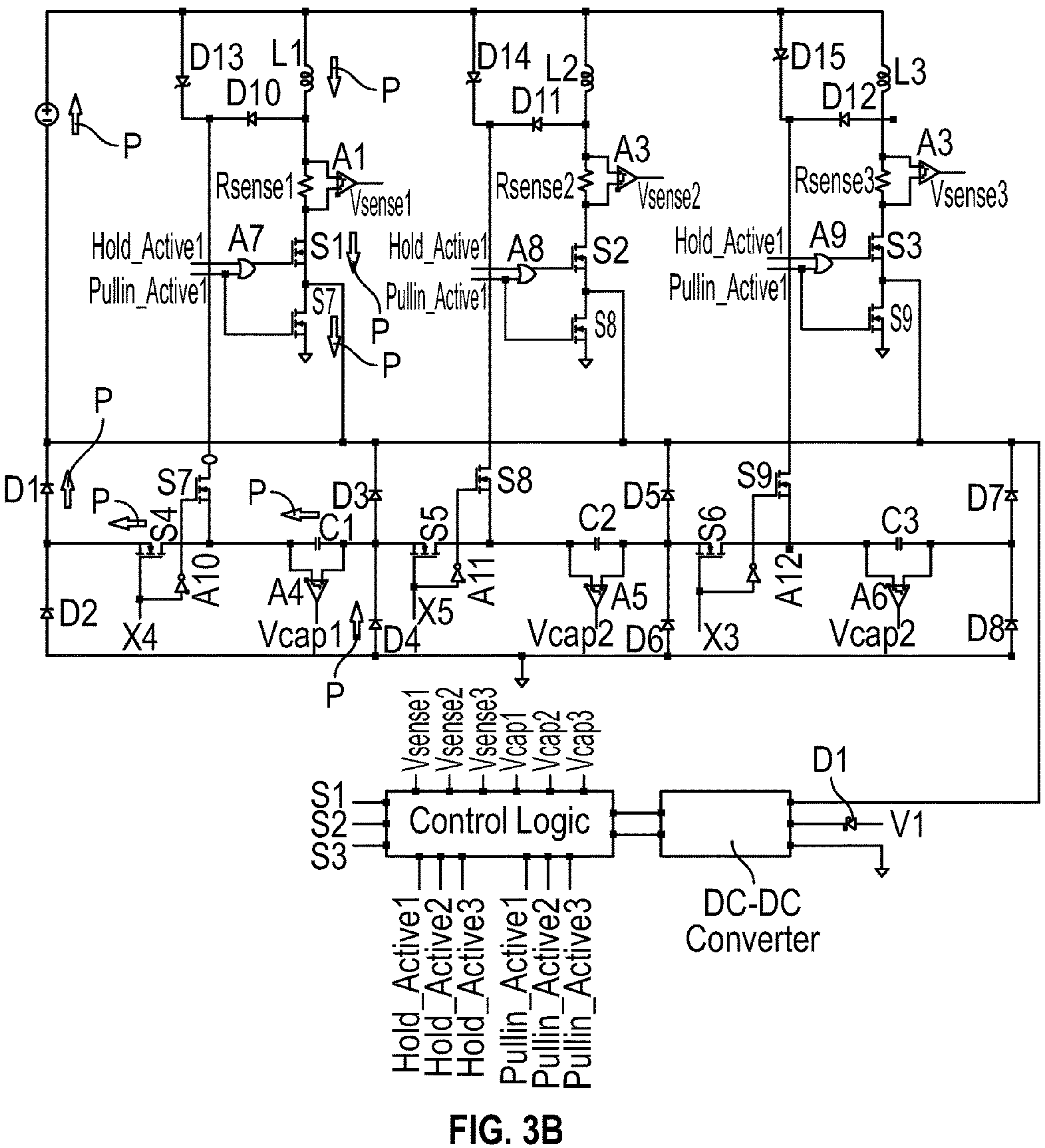

With reference to FIG. 3B, during pull in, S1/S10 and S4 are opened and S7 is closed. This results in the V1 and the charged stored in C1 being applied across L1/S1. The solenoid current path during pull-in operation is GND→D4→C1→S4→D1→V1→L1→Rsense1→S1→S10→GND as shown by the large arrows labelled "P" in FIG. 3B. During pull-in of the portions of the circuit associated with coil L2 (portions 302*b*/304*b*) the solenoid current path is GND→D6→C2→S5→D3→V1→L2→Rsense2→S2→S11→GND. During pull-in of the portions of the circuit associated with coil L3 (portions 302*c*/304*c*) the solenoid current path is GND→D8→C3→S6→D6→V1→L3→Rsense3→S3→S12→GND.

During hold, S1 is open, S10 and S4 and closed and V1 drives L1 as in the prior art. The current path is V1→L1→Rsense1→S1→V1 as indicated by the large arrows labelled "H" shown in FIG. 3C. During hold, the controller can initiate hold current operation either by providing PWM or reducing the voltage source V1. PWM implementation may allow for establish constant current in solenoid and has duty cycle 0%-100% based on voltage source V1. This operation can continue until the solenoid is released.

Upon release (or regeneration) S1 and S10 can be closed and S7 is opened. This is shown in FIG. 3D. The magnetic field in the solenoid coil L1 inductance "collapses," "causing the inductor current to recirculate through the solenoid L1 and maintain the magnetic field of the solenoid. This in turn forces the current to flow through the second diode D10, which acts as a steering diode. This is a so-called regeneration phase and is current path is shown by arrows R. During this time, the net voltage stored in capacitor C1 is equal to demagnetization voltage L1*di/dt+V1. More precisely, there will be some voltage drop accords the Diodes D3 and D10 but that can be factored in as need.

In this and all other embodiments, size of the capacitor C1 (or C2/C3 below) is selected based on the value of L/R time constant and the desired circuit response speed, and varying the capacitor C1 size changes the charging and discharging circuit operation.

In some instances, the charge stored in C1 can be provided to the control circuit 206 or another element such as a DC-to-DC converter by turning off V1 and opening S4/S5/S6. In this case, the current path is GND→D8→C3→S6→C2→S5→C1→S4→D1→receiver. The receiver can the controller, the DC-to-DC converter or another location.

An example that references all of FIGS. 3A-3D will now be presented. Considering VC1 is enabled by switch S4, the voltage across solenoid coil L1 is equal to V1+Vc1−Vdiodedrop (D1, D4). As current flows, the capacitor C1 discharges at a rate that is determined by the size of the capacitor C1 and the solenoid L/R value until the capacitor C1 voltage reaches the battery voltage. The size of the capacitor C1 is selected based on the value of L/R time constant and the desired circuit response speed, and varying the capacitor C1 size changes the charging and discharging circuit operation. Alternatively, if lower voltage source V1 is deployed, then two capacitor stage (C1, C2) or three capacitor stage (C1, C2, C3) can be switched in series to achieve nominal solenoid operating voltage i.e., V1=10V then switching S4, S5, S6=ON will provide 40V across L1 for pull-in. Due to diode bridge implementation it is easy to establish multiple charge pump configurations with no modification in existing circuit configuration. Thus, three different voltages can be applied to solenoid coil L1:

$$Vsolenoid1 = VC1 + V1 - Vdiodedrop\ (D1, D4); \text{ (or)}$$

$$Vsolenoid1 = VC1 + VC2 + V1 - Vdiodedrop\ (D1, D6) \text{ (or)}$$

$$Vsolenoid1 = VC1 + VC2 + VC3 + V1 - Vdiodedrop\ (D1, D8).$$

Similarly, Vsolenoid2 and Vsolenoid3 can be configured in combination as above.

Once plunger is moved to the "pulled-in" position, the pull-in current would be maximum equivalent to the DC resistance offered by the solenoid. The control logic section would initiate hold current operation either by providing PWM or reducing the voltage source V1. PWM may establish constant current in solenoid and has duty cycle 0%-100% based on voltage source V1.

During hold, (FIG. 3C) when the current in the solenoid has reached maximum threshold value (different threshold is set for pull-in and hold mode), the switches S1, S10 open. The magnetic field in the solenoid inductance "collapses," causing the inductor current to recirculate through the solenoid coil L1 to maintain the magnetic field of the solenoid. This in turn forces the current to flow through the second diode D10, which acts as a steering diode. At this point, the current level gradually drops at a slower rate due to resistive losses in the circuit. Therefore, during solenoid off condition (S1, S10=OFF—FIG. 3D) the net voltage stored in capacitor C1 is equal to demagnetization voltage L1*di/dt+V1.

Thus, the net energy stored in capacitor C1 is V1+demagnetization voltage-Vdiodedrop (D3, D10).

Figure 3C:
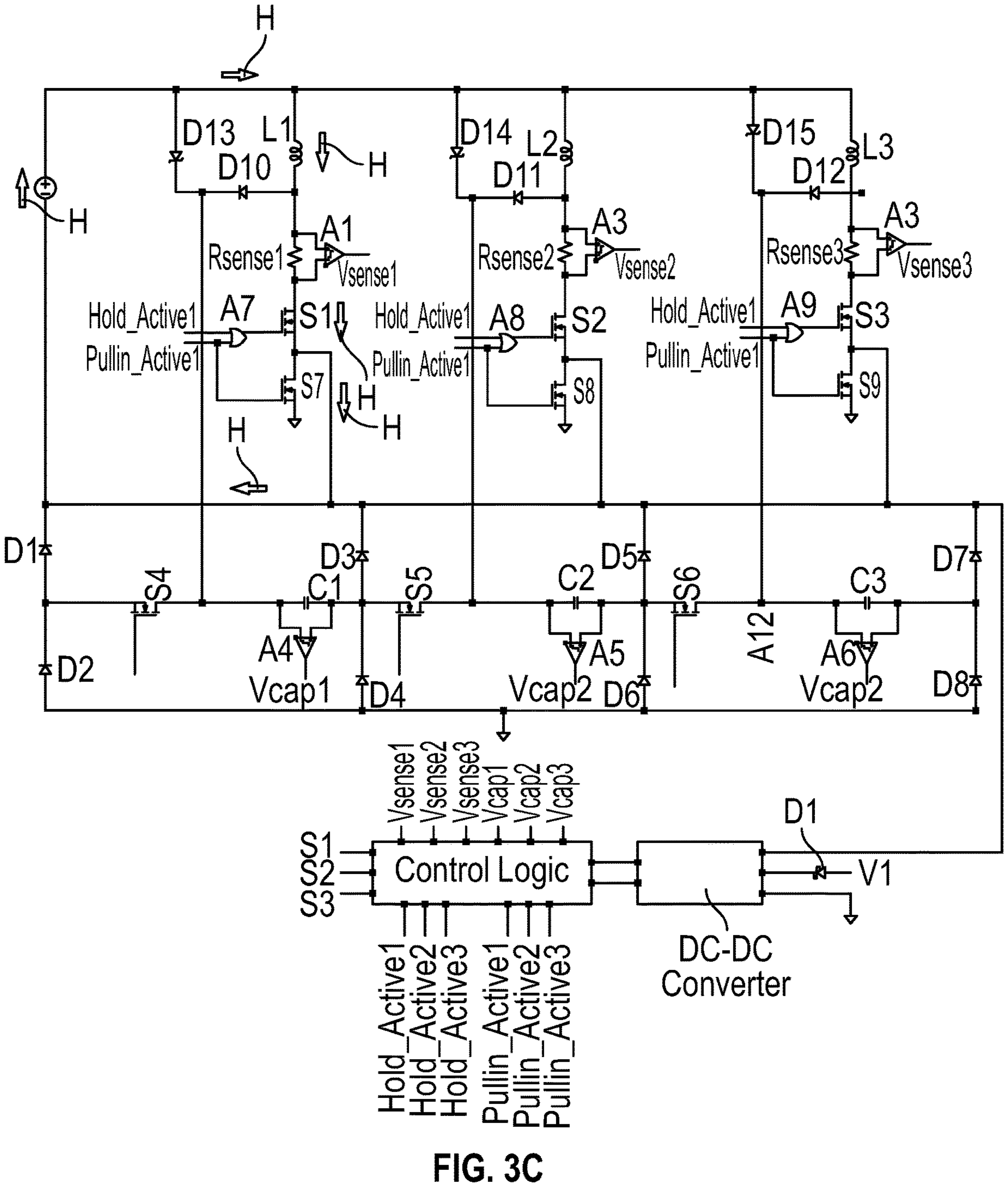
Figure 3D:
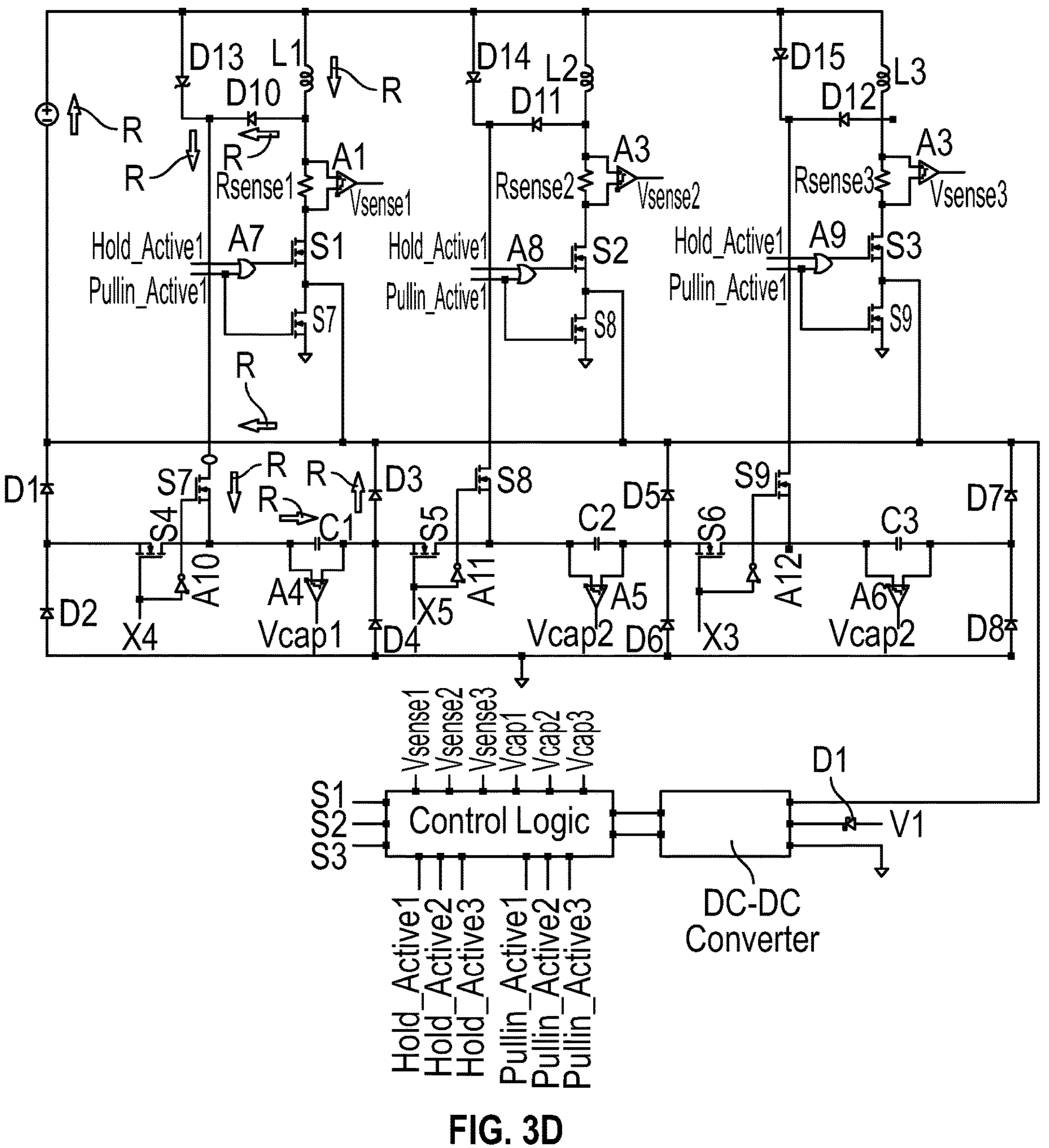
Figure 3E:
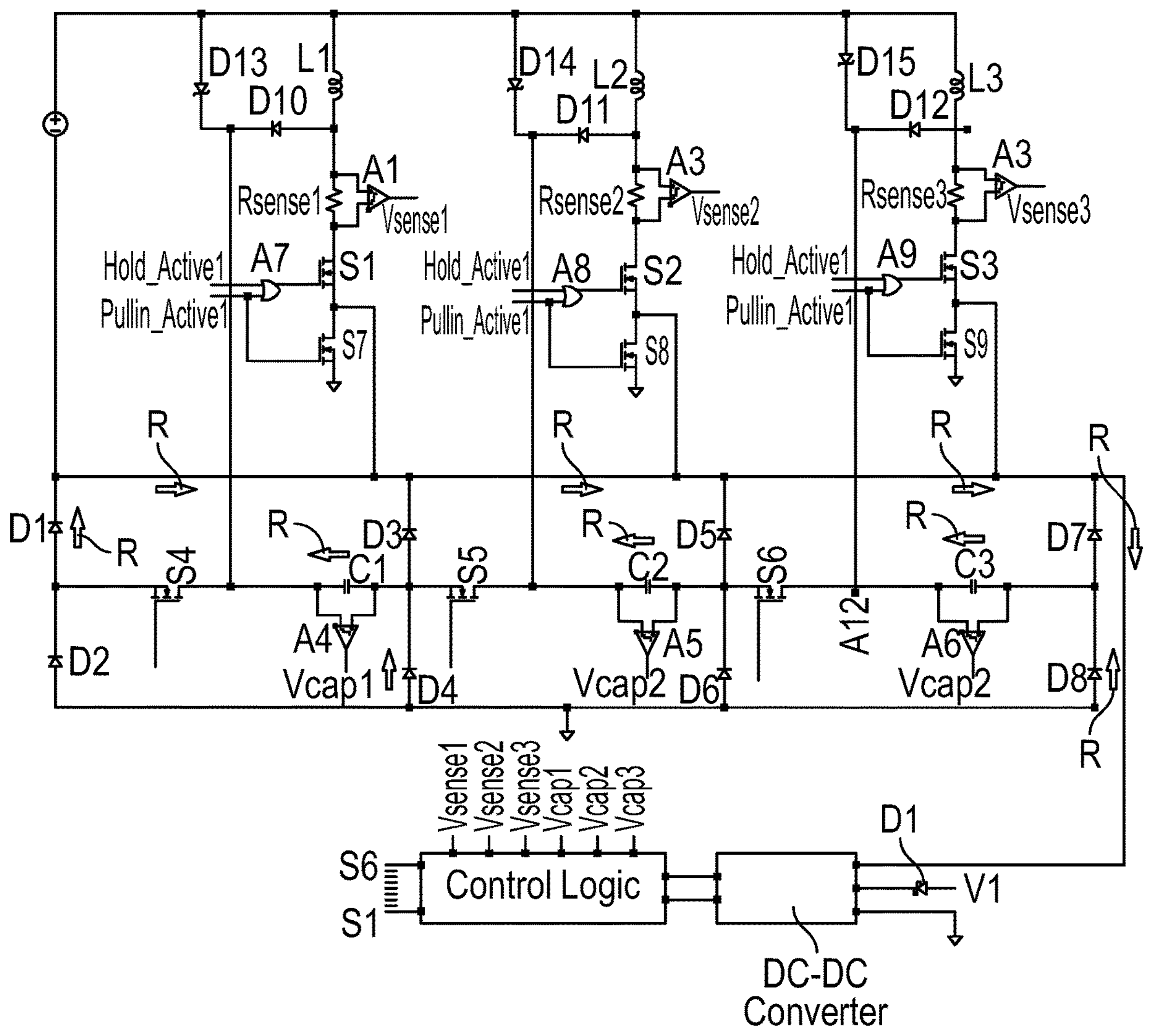

When the solenoid hold current has decreased to a desired lower threshold level, the control logic will again close the switch S1 causing to conduct supply current from V1 and direct the current according to current path shown in FIG. 3C in-order to increase the solenoid current level. The level at which this occurs can be selected and controlled by the controller based on, for example, the system's tolerance to current ripple, switching losses, noise generation, etc.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A solenoid drive circuit comprising:

a power source;

a first solenoid control circuit connected to the power source, the first solenoid control circuit including a first solenoid coil and a first solenoid control switch configured to control a flow of current through the first solenoid coil; and a first regenerative drive circuit connected to the first solenoid control circuit and that includes a first regenerative capacitor, the first regenerative drive circuit including:

a first diode bridge formed of four diodes (D1, D2, D3 and D4) and that has a positive input, a negative input, a positive output and a negative output, wherein the first regenerative capacitor is connected between the positive and negative inputs;

wherein the first regenerative drive circuit includes a storage input and wherein the storage input is connected to the first solenoid control circuit so that current from the first solenoid control circuit can be provided to and stored in the first regenerative capacitor; and wherein the first regenerative drive circuit includes two switches arranged such that only one of the two switches is open at a time, wherein a first of the two switches is connected between the storage input and the first regenerative capacitor and a second of the two switches is connected between positive input and the first regenerative capacitor.

2. The solenoid drive circuit of claim 1, wherein the first regenerative drive circuit selectively allows current to pass from the first solenoid control circuit to the first regenerative capacitor.

3. The solenoid drive circuit of claim 1, further comprising:

a control circuit configured to control the state of the first solenoid control switch, and the two switches, to operate at least in a charge mode, a pull in mode and a hold mode.

4. The solenoid drive circuit of claim 3, wherein in the charge mode the first solenoid control switch is closed, and the first of the two switches is open so that current that is provided to the first solenoid control circuit by the power source is stored in the first regenerative capacitor.

5. The solenoid drive circuit of claim 4, wherein in the pull in mode the first solenoid control switch is opened, and the second of the two switches is open so that charge stored in the first regenerative capacitor and current that is provided by the power source can both be provided to the first solenoid coil.

6. The solenoid drive circuit of claim 5, wherein in the hold mode, the first solenoid control switch is configured to be selectively opened and closed to control a current through first solenoid coil the second of the two switches is open so energy provided by the power source that is not allowed to pass through the first solenoid coil when the first solenoid control switch can be provided to the first regenerative capacitor.

7. The solenoid drive circuit of claim 3, further comprising a second solenoid control switch connected between the first solenoid control switch and ground and wherein a node is defined between first and second solenoid control switches that is connected to a negative terminal of power source.

8. The solenoid drive circuit of claim 3, wherein in the charge mode the first solenoid control switch is closed, and the first of the two switches is open so that current that is provided to the first solenoid control circuit by the power source is stored in the first regenerative capacitor.

9. The solenoid drive circuit of claim 8, wherein in the pull in mode the first and the second solenoid control switches are opened, and the second of the two switches is open so that charge stored in the first regenerative capacitor and current that is provided by the power source can both be provided to the first solenoid coil.

10. The solenoid drive circuit of claim 5, wherein in the hold mode, the first solenoid control switch is configured to be selectively opened and closed to control a current through first solenoid coil the second of the two switches is open so energy provided by the power source that is not allowed to pass through the first solenoid coil when the first solenoid control switch can be provided to the first regenerative capacitor.

11. A method of controlling a solenoid drive circuit as recited in claim 1, the method comprising:

operating a switch that selectively allows current to pass from the first solenoid control circuit to the first regenerative capacitor.

12. The method of claim 11, wherein the drive circuit further includes a control circuit that controls the state of the first solenoid control switch, wherein the method further includes:

operating the circuit in at least one of: a charge mode, a pull in mode and a hold mode.

13. The method of claim 12, wherein when operating in the charge mode the first solenoid control switch is closed, and the first of the two switches is open so that current provided to the first solenoid control circuit by the power source is stored in the first regenerative capacitor.

14. The method of claim 13, wherein when operating in the pull in mode the first solenoid control switch is opened, and the second of the two switches is open so that charge stored in the first regenerative capacitor and current that is provided by the power source can both be provided to the first solenoid coil.

15. The method of claim 14, wherein in the hold mode, the first solenoid control switch is selectively opened and closed to control a current through the first solenoid coil and the second of the two switches is open so energy provided by the power source that is not allowed to pass through the first solenoid coil when the first solenoid control switch is closed can be provided to the first regenerative capacitor.

16. The method of claim 12, wherein the drive circuit further includes a second solenoid control switch connected between the first solenoid control switch and ground and wherein a node is defined between first and second solenoid control switches that is connected to a negative terminal of power source;

wherein in the charge mode the first solenoid control switch is closed, and the first of the two switches is open so that current provided to the first solenoid control circuit by the power source is stored in the first regenerative capacitor;

wherein in the pull in mode the first and the second solenoid control switches are opened, and the second of the two switches is open so that charge stored in the first regenerative capacitor and current that is provided by the power source can both be provided to the first solenoid coil; and wherein in the hold mode, the first solenoid control switch is selectively opened and closed to control a current through first solenoid coil the second of the two switches is open so energy provided by the power source that is not allowed to pass through the first solenoid coil when the first solenoid control switch can be provided to the first regenerative capacitor.

* * * * *